United States Patent
Sojka et al.

(10) Patent No.: US 9,112,932 B1
(45) Date of Patent: *Aug. 18, 2015

(54) ENTERPRISE CONFERENCING WITH DUAL MIXING (71) Applicant: West Corporation, Omaha, NE (US)

(72) Inventors: Myron P. Sojka, Logan, IA (US);
Stephen D. McCoy, Omaha, NE (US);
Srinivas Maganti, Andhra Pradesh (IN)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,468

(22) Filed: Oct. 28, 2014

Related U.S. Application Data (63) Continuation of application No. 14/150,204, filed on Jan. 8, 2014, now Pat. No. 8,917,634, which is a continuation of application No. 12/139,540, filed on Jun. 16, 2008, now Pat. No. 8,638,696, which is a continuation-in-part of application No. 12/039,380, filed on Feb. 28, 2008, now Pat. No. 8,458,253.

(51) Int. Cl.
*H04L 29/06* (2006.01)
*H04M 3/56* (2006.01)
*H04M 7/12* (2006.01)

(52) U.S. Cl.
CPC .......... *H04L 65/403* (2013.01); *H04L 65/1006* (2013.01); *H04L 65/1069* (2013.01); *H04M 3/563* (2013.01); *H04M 7/1295* (2013.01)

(58) Field of Classification Search
CPC .............. H04L 65/403; H04L 65/1006; H04L 65/1069; H04M 7/1295; H04M 3/563
USPC .......................................... 370/260, 261, 262
See application file for complete search history.

(56) References Cited

U.S. PATENT DOCUMENTS

| | | | |
|---|---|---|---|
| 5,546,449 | A | 8/1996 | Hogan et al. |
| 5,859,900 | A | 1/1999 | Bauer et al. |
| 6,584,076 | B1 | 6/2003 | Aravamudan et al. |
| 6,876,734 | B1 | 4/2005 | Summers et al. |
| 7,254,643 | B1 | 8/2007 | Peters et al. |
| 7,460,548 | B2 | 12/2008 | Stumer |
| 7,586,857 | B2 | 9/2009 | Ejzak et al. |
| 8,638,696 | B1 * | 1/2014 | Sojka et al. ................... 370/260 |
| 2003/0145054 | A1 | 7/2003 | Dyke |
| 2004/0062210 | A1 | 4/2004 | Genter et al. |
| 2006/0239249 | A1 | 10/2006 | Banner et al. |
| 2006/0245574 | A1 | 11/2006 | Phelps et al. |
| 2006/0270447 | A1 | 11/2006 | Everson et al. |
| 2007/0133575 | A1 | 6/2007 | Cai et al. |
| 2007/0294425 | A1 | 12/2007 | Sobti et al. |
| 2008/0317238 | A1 | 12/2008 | Cai et al. |

* cited by examiner

*Primary Examiner* — Mohammad Anwar (57) ABSTRACT

A method and computer readable medium for providing Enterprise conferencing is provided. In an exemplary embodiment of the invention, a first SIP INVITE message is exchanged between a Media Gateway of the Enterprise and a first Media Server of a Conferencing Service Provider. Then, an Application Server of the Conferencing Service Provider establishes conference call resources at the Conferencing Service Provider. A first RTP session is established between the Media Gateway and the first Media Server, and then a PROMPT AND COLLECT message is sent from the Application Server to the first Media Server to gather data from the caller for establishing the Enterprise conferencing. After receipt of the data by the Application Server, an SIP INFO message is sent from the Application Server to a second Media Server of the Conferencing Service Provider, selecting the second Media Server to host the call.

20 Claims, 5 Drawing Sheets

ENTERPRISE CONFERENCING WITH DUAL MIXING

CROSS-REFERENCE TO RELATED APPLICATIONS

The present application is a continuation of and claims priority to U.S. patent application Ser. No. 14/150,204, filed Jan. 8, 2014 and titled Enterprise Conferencing With Dual Mixing, which is a continuation of and claims priority to U.S. patent application Ser. No. 12/139,540, filed Jun. 16, 2008 and titled Enterprise Conferencing With Dual Mixing, now issued U.S. Pat. No. 8,638,696 which is a continuation-in-part of and claims priority to U.S. patent application Ser. No. 12/039,380, filed Feb. 28, 2008 and titled Enterprise Conferencing with Dual Mixing, now issued U.S. Pat. No. 8,458,253, all of which are hereby incorporated by reference herein in its entirety.

BACKGROUND OF THE INVENTION

The present invention is a system, method, and computer readable medium for providing audio/video/data conferencing to an enterprise that has both internal and external entities joining a conference.

Currently, many service providers offer conferencing services to enterprises that support callers both internal and external to the enterprise. Typically, these services are provided by conferencing servers located at centralized data centers which are often co-resident with Public Switched Telephone Network (PSTN) ingress/egress points.

When a conference is setup, individual calls from the enterprise are backhauled to the data center through either a public or private, voice or data network. The problem with this approach is that backhauling all of the individual call legs takes a significant amount of bandwidth, and thus adds cost to the service provider which is often, in turn, passed onto the enterprise customer.

Therefore, what is needed to overcome the aforementioned limitation, is a system in which the enterprise legs of a conference can be combined before being backhauled to the conference service and a method for managing a conference in such a system. What is also required is the ability to maintain enterprise originated conference calls at the enterprise premise and bridge external participants as needed to the enterprise from other conference service providers.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

The present invention, accordingly, eliminates the need for each leg of a conference to require its own, individual backhaul entity to the conferencing data center. This is accomplished by establishing equipment at the enterprise entity that allows each conferencing leg exiting the Public Branch Exchange (PBX) or similar entity at the enterprise to be mixed and converted to a consolidated, Internet Protocol (IP) stream for processing over an IP Network. Certain entities of the Conferencing Service Provider's network are repeated at the enterprise premise to perform this consolidation. A Media Gateway is used at the enterprise site to:

mix all conferencing legs leaving the enterprise;
    convert PBX multi-media conference signaling formats to a consolidated IP stream for communication with the Conferencing Service Provider;
    serve as proxy server for interfacing with Conferencing Service Provider Application Server and local Media Servers.

Media Servers would reside at the enterprise premise for the hosting of enterprise conferences locally to the enterprise location. These units would also serve as Voice over IP (VoIP) interfaces with the Media Servers located at the Conferencing Service Provider's site as conference participants external to the enterprise join the conference.

By having a Media Gateway and Media Servers at the enterprise premise, it allows conferences established from the enterprise to be served at the enterprise with no backhaul connectivity required to the Conferencing Service Provider. As external conference participants join the conference, a single IP connection over the Wide Area Network (WAN) and interfaced with the Conferencing Service Provider for both signaling and bearer traffic would be used to join these external conference participants to the local enterprise conference. As additional conference calls are required to be established and served from the enterprise, the same IP connection can be used, therefore eliminating the need for multiple connections to be established back to the Conferencing Data Center for processing and thus eliminating the additional cost associated with providing and maintaining these connections.

Thus, in one aspect, the present invention is directed to a method for providing Enterprise conferencing. A first SIP INVITE message is exchanged between a Media Gateway of the Enterprise and a first Media Server of an Enterprise. Then, an Application Server of the Conferencing Service Provider establishes conference call resources at the Conferencing Service Provider. A first RTP session is established between the Media Gateway and the first Media Server, and then a PROMPT AND COLLECT message is sent from the Application Server to the first Media Server to gather data from the caller for establishing the Enterprise conferencing. After receipt of the data by the Application Server, a SIP INFO message is sent from the Application Server to a second Media Server of the Enterprise, and the second Media Server is selected to host the call.

In another aspect of the invention there is a method for joining a conference call hosted at an Enterprise, comprising: entering address data by a caller into a communication device to initiate a call to join an established conference call, the address information indicating a location of the conference call; connecting the communication device with a Media Gateway at the Enterprise through a PSTN; sending a SIP INVITE message from the Media Gateway to a first Media Server at a Conferencing Service Provider; sending a CALL WAITING message from the first Media Server to an Application Server; verifying at the Application Server that the caller has access privileges for the established conference call, and upon verification, sending an ACCEPT CALL message from the Application Server to the first Media Server; sending a SIP OK message from the first Media Server to the Media Gateway in response to the ACCEPT CALL message; and acknowledging the SIP OK message by sending a SIP ACK message from the Media Gateway to the first Media Server.

Any of the exemplary methods of the invention may implemented by computer readable medium which includes instructions for executing the methods.

DETAILED DESCRIPTION OF THE INVENTION

In accordance with the principles of the invention, Enterprise Systems looking to reduce the cost of maintaining expensive PSTN connectivity for conference call activity establish premise equipment (Media Gateway and Media Servers) to allow connectivity directly to the Conferencing Service Provider via the Wide Area Network (WAN). This allows the Enterprise System to bypass PSTN connectivity for all conference call activity and ultimately reduce the cost of maintaining multiple PSTN connections for this use.

Figure 1:
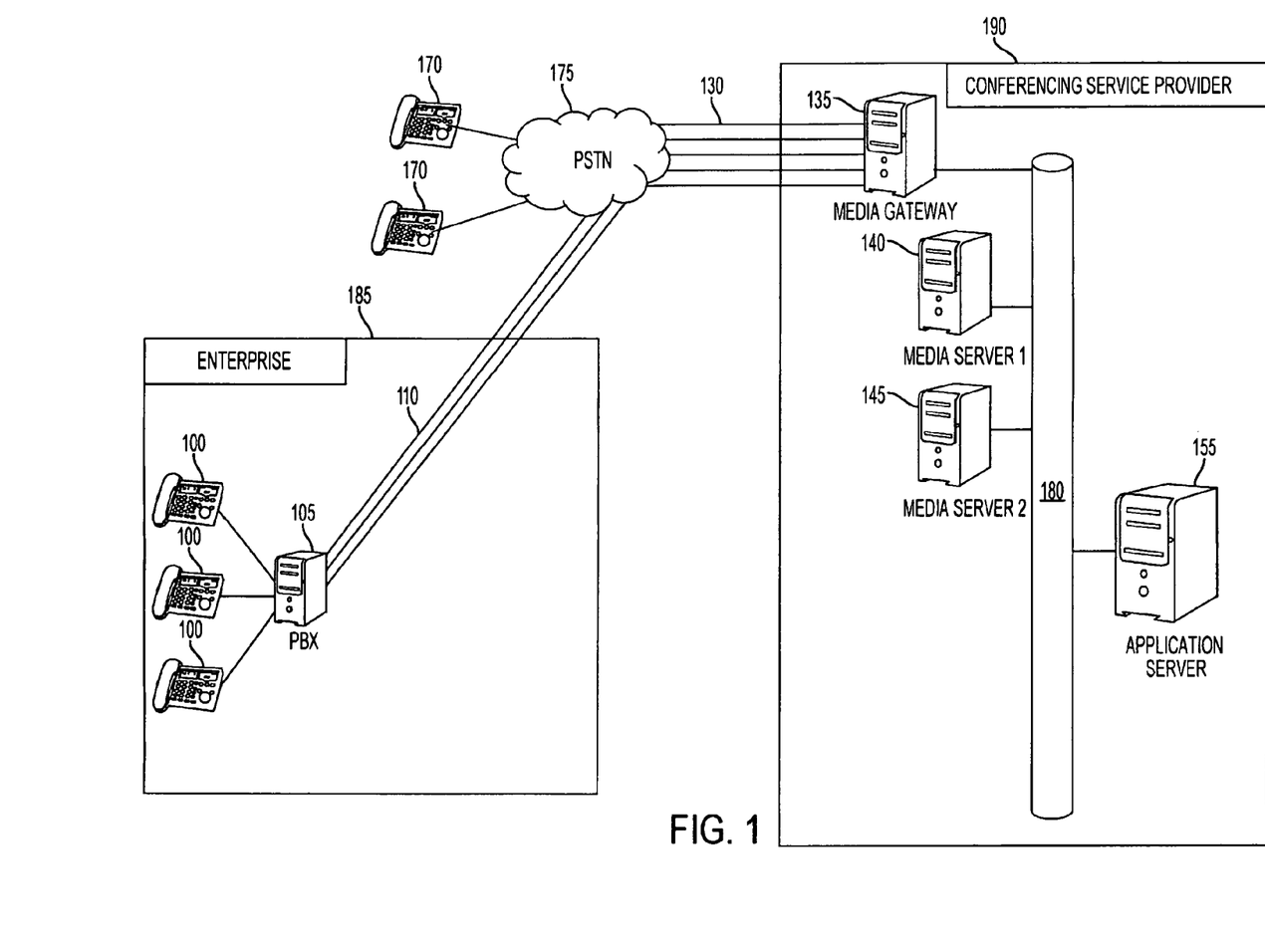
FIG. 1 depicts a typical configuration of how users on an Enterprise System currently interface back to a Conferencing Service Provider via the PSTN Network for establishing or joining a pre-existing conference call in accordance with a preferred embodiment of the present invention.

With reference now to the figures and in particular with reference to FIG. 1, a diagram of a Enterprise Telephony System interfaced to a Conferencing Service Provider is depicted in accordance with a preferred embodiment of the present invention. It should be noted that each device represented can have multiple instances within the architecture. FIG. 1 depicts only one instance of each entity for simplification purposes. Enterprise 185 represents any size business or organization requiring conferencing services from an external conferencing service provider. Enterprise 185 is represented herein as containing multiple Callers 100 connected to a Public Branch Exchange 105 or similar entity known in the art for serving business telecommunication needs. Callers 100 can be any multitude of entities within the Enterprise 185 and is beyond the scope of this invention. FIG. 1 represents multiple Caller 100 entities to clearly depict the problem of PSTN connectivity required as multiple callers exist in an Enterprise. "Caller", as referenced in this embodiment, will represent either a conference host or conference participant. Conference host is defined as a user who is establishing and hosting a conference call. Conference participant is one of possible many participants that will join a conference that another "Caller" is hosting. "Callers" can reside at the enterprise or at the PSTN and can be either conference hosts or conference participants. Connectivity between the Caller 100 and PBX 105 can be in any format or medium supported by the PBX. For clarity purposes, this invention assumes that this connectivity is a typical Time Division Multiplexed (TDM) circuit-switched connection. The PBX serves as the switching entity and telecommunications application server within the Enterprise 185. It routes calls as required between internal callers within the enterprise and also routes internal callers to external interfaces outside of the Enterprise 185 via the PSTN 175.

The PBX 105 interfaces with the PSTN 175 via multiple Circuit-Switched Connections 110. These connections are typical DS1/E1 interfaces that are well known in the art. These connections are usually leased from the PSTN service provider. The amount of connections required is defined by the number of users being hosted on the PBX and the capability of the PBX to share these connections amongst multiple users.

Continuing to refer to FIG. 1, Caller 170 represents conference host or conference participants external to the Enterprise 185. For the purpose of this embodiment, Caller 170 represents any caller needing to host or join a conference call via the PSTN 175 hosted by the Conferencing Service Provider 190. As is illustrated in the diagram, connectivity between the PSTN 175 and the entry point into the Conferencing Service Provider's network is supplied by Circuit-Switched Connections 130. These connections can be of many varieties and are only limited by the interface connectivity method supported by the Conferencing Service Provider's Media Gateway 135 and the PSTN 175. For the purpose of this invention, it should be assumed that this connectivity is DS1/DS3 (North American) or E1/E3 (International) based. It should also be assumed that PSTN 175 does not need to reside in the same geographical region as the Conferencing Service Provider. The Enterprise 185 and PSTN 175 could reside internationally with the Conferencing Service Provider residing locally.

The Conferencing Service Provider 190 is an entity that provides conferencing services to enterprises or other business entities. For the purposes of this embodiment, it is made up of multiple components all networked together to perform the service. The entities of this platform include the Media Gateway 135, Media Servers 140 and 145, an Application Server 155, and a networking backbone 180 that links all components together.

Media Gateway 135 is the device that interfaces directly with the PSTN and supplies the conversion of the circuit-switched conference call to an Internet Protocol (IP) stream and vice versa for processing within the conferencing system. The Media Gateway uses the Session Initiated Protocol (SIP) or similar IP control-plane protocol for session establishment and maintenance with the other components in the system. It uses the Real Time Reservation Protocol (RTP) or similar bearer-plane protocol for establishing bearer-plane Voice over IP (VoIP) connections in the system. Media Servers 140/145 in the Conferencing System 190 are used to host the conference calls and supply all features associate with conferencing. These systems are well known in the art and can be made up of common forms of processing medium capable of running commercially available software suites providing SIP conferencing or similar IP telephony based software packages. The Media Servers 140/145 are assigned to specific conferences by the Application Server 155. The Application Server 155 is the heart of the conferencing system and provides all initial call setup processing and resource management within the system. It receives SIP calls from the Media Gateway 135 and establishes conference sessions via RTP between the Media Gateway 135 and Media Servers 140/145. It controls call flow and conference business logic within the system.

FIG. 1 represents the current connectivity that exists between the Enterprise System 185 and the Conferencing Service Provider 190. Circuit-switched connectivity 110 can be costly for an Enterprise System to maintain and drives the need for alternative methods for multiple conference call traffic to the external Conferencing Service Provider.

Figure 2:
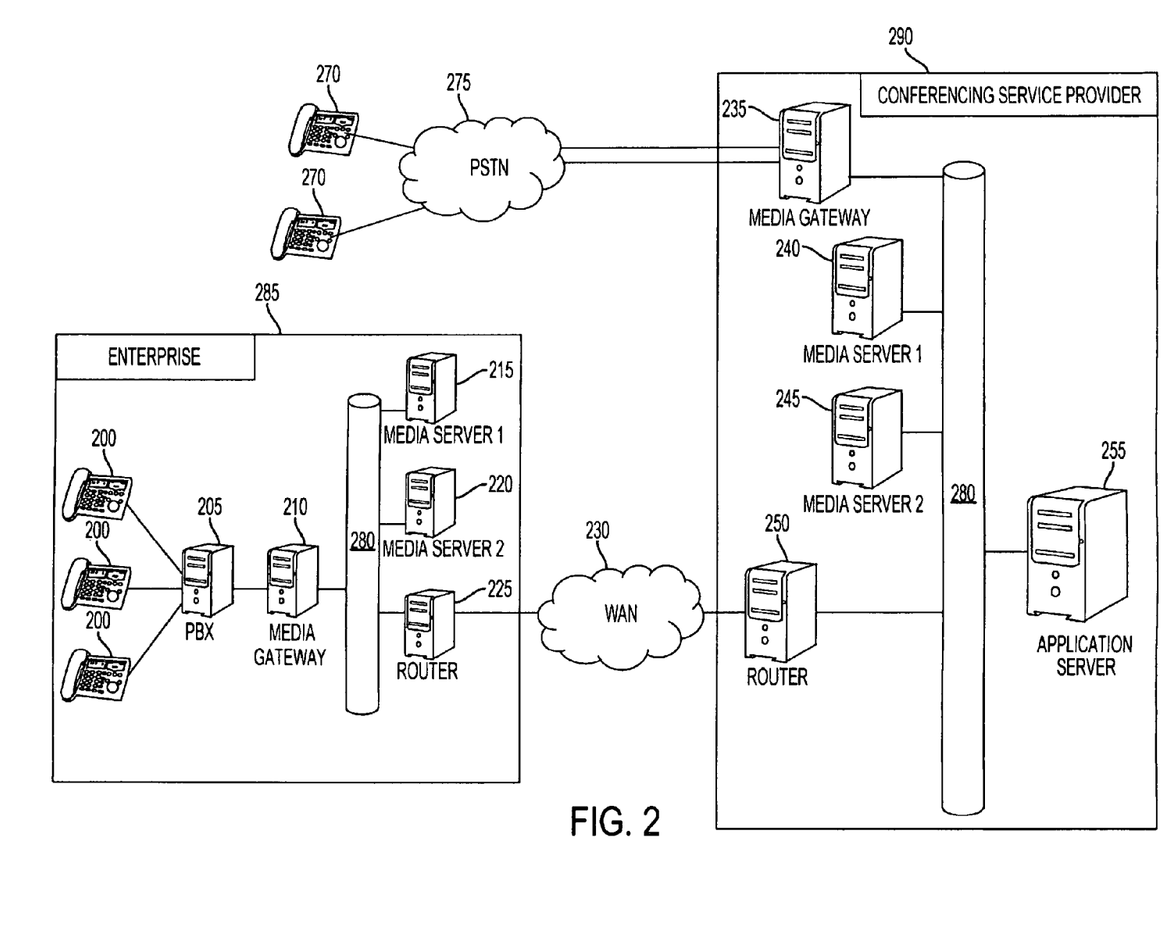
FIG. 2 depicts the addition of Conferencing Media Gateway and Media Servers at the Enterprise site and the required physical connectivity to the WAN in accordance with a preferred embodiment of the present invention.

With reference now to FIG. 2, a recommended conference call routing mechanism is depicted in accordance with a preferred embodiment of the present invention. FIG. 2 shows the addition of a Media Gateway 210, IP Backbone Network 280, Media Server-1 215, Media Server-2 220, and Router 225. These devices are added at the Enterprise System 285 premise for maintaining local conference call establishment and Internet Protocol routing of conference calls over the Wide Area Network 230 to the Conferencing Service Provider 290. These devices allow the "bridging" or mixing of conference callers external to the enterprise with conference callers within the enterprise.

In the depicted figure and with particular reference to Enterprise System 285, Callers 200 are interfaced to PBX 205 and are either conference hosts or conference participants with respect to the current invention. PBX 205 hosts these callers and performs telephony routing and call maintenance. Multiple circuit-switched connections leaving PBX 205 interface with a Media Gateway 210. The Media Gateway 210 converts the circuit switched connections into IP based sessions and communicates directly with the Application Server 255 at the Conferencing Service Provider 290 via Routers 225 and 250 and the Wide Area Network (WAN) 230. The Application Server 255 is the main interface server in the Conferencing Service Provider 290 network. It serves as a proxy server to all of the other SIP entities in the network and maintains location based data of all Media Server entities both internal and external to the network. It also performs the associated routing necessary to establish and maintain the conferences. It performs all resource management within the network and maintains information on available Media Server resources and allocates these resources as requested.

Figure 3:
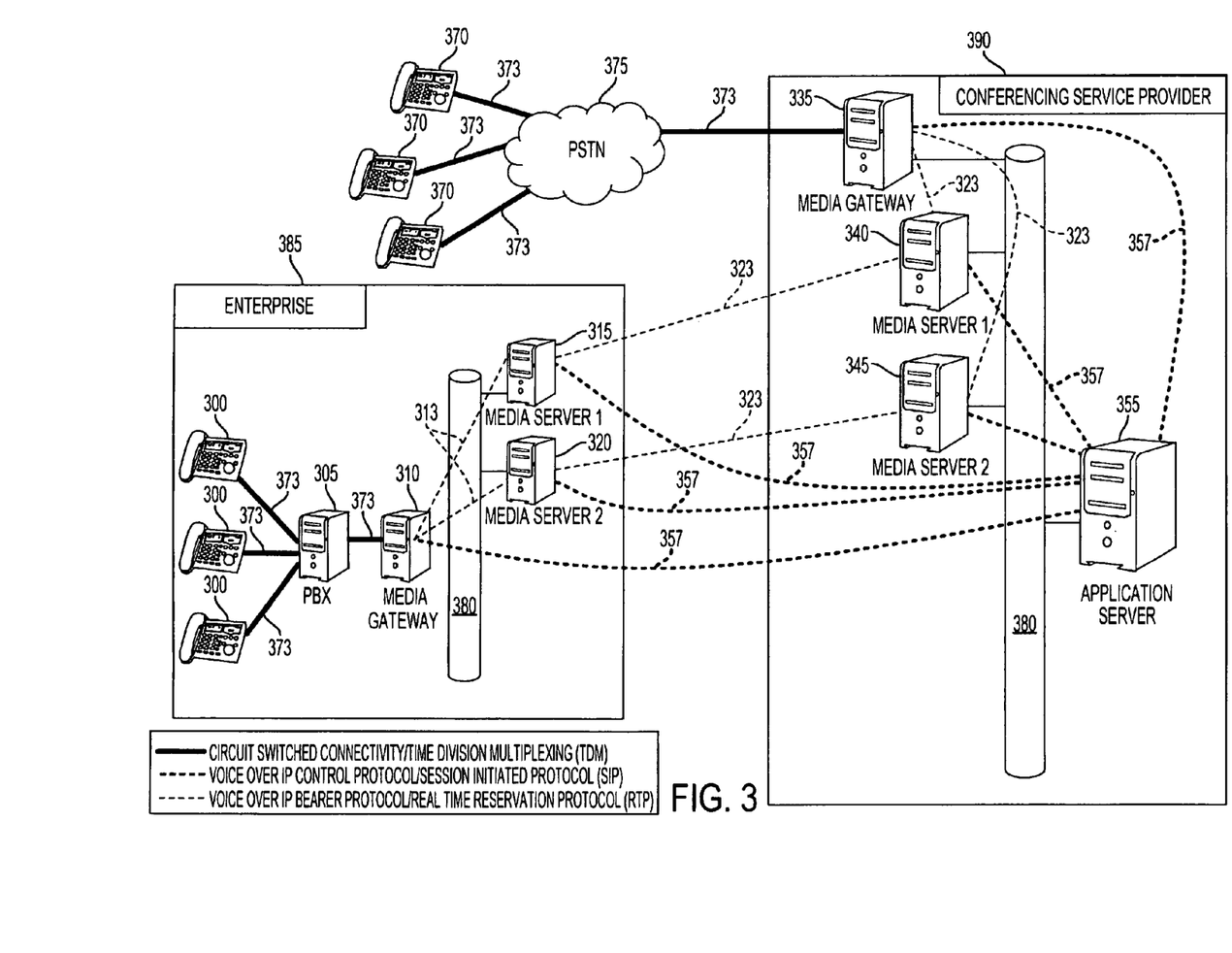
FIG. 3 depicts a further refinement of FIG. 2 by showing the logical connectivity of the embodiment and software protocols used to establish and maintain conference calls in accordance with a preferred embodiment of the present invention.

With reference now to FIG. 3, a logical connectivity diagram is depicted in accordance with a preferred embodiment of the present invention. As discussed in FIG. 2, Callers 300 communicate with the PBX in a format that is supported by that PBX. These Interfaces 373 are beyond the scope of this invention. For simplification purposes, it will be assumed that these Interfaces 373 are circuit-switched TDM interfaces. It is also assumed that Interface 373 exists between the PBX 305 and the Media Gateway 310. This interface is driven by the supported media interface cards supported by the Media Server 310 and is beyond the scope of this invention. As Callers 300 either establish or attempt to join conferences, Media Server 310 communicates with Application Server 355. At this point in the invention, all communication is based on IP Telephony protocols. These protocols can be any IP Telephony protocols that support session establishment/management as well as Real-Time Voice over IP. For the purposes of this invention, it will be assumed that all session based IP telephony is SIP based and all Voice over IP is RTP.

Figure 4:
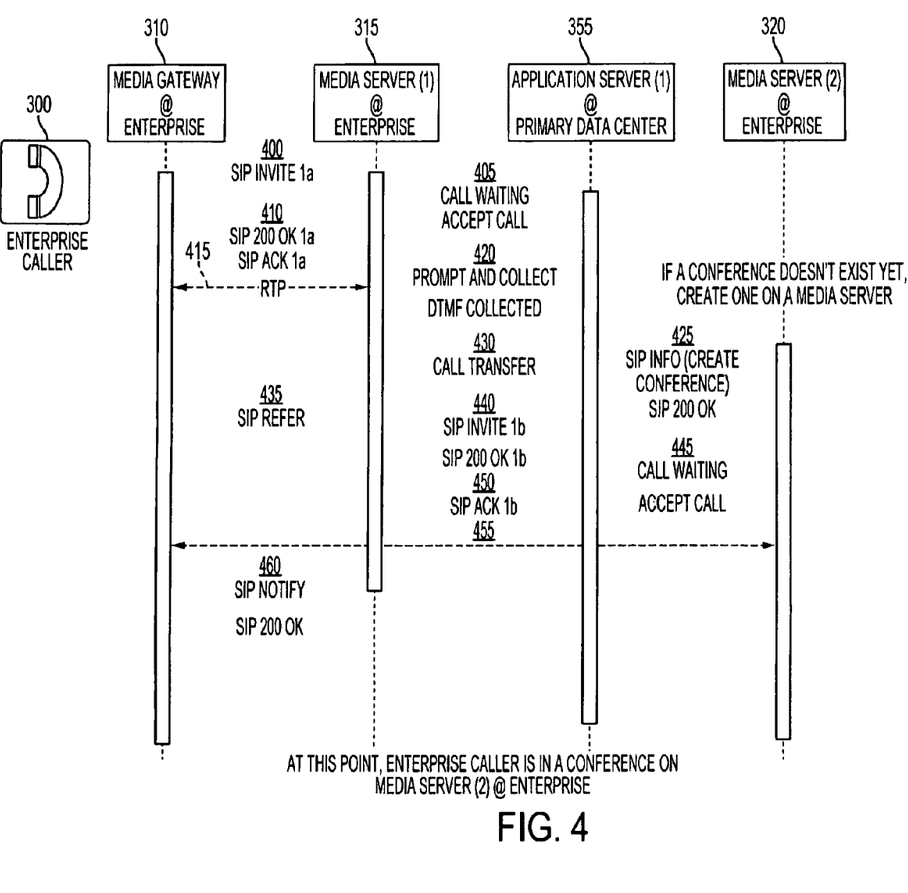
FIG. 4 depicts actual Session Initiated Protocol (SIP)/Real Time Reservation Protocol (RTP) message flows required for the Enterprise caller to establish or join a conference call in accordance with a preferred embodiment of the present invention.

Continuing to reference FIG. 3 along with referencing FIG. 4 as a message flow reference, and assuming a conference call is being attempted to be setup by one of Callers 300, a SIP INVITE 400 message would be exchanged between the Media Gateway 310 and the Media Server 1 315 for establishing a session to support this call between these entities. Media Server 1 315 then initiates a CALL WAITING 405 message to Application Server 355 to establish the Conference Call resources at the Conferencing Service Provider 390. Application Server 355 verifies that caller is authorized to establish a conference on this system. Once this is verified, it will respond back to the Media Server 1 315 with an ACCEPT CALL response. Media Server 1 315 then responds back to the Media Gateway 310 with a SIP 200 OK 410 message. Media Gateway 410 will acknowledge this with a SIP ACK back to Media Server 1 315. With the session now established between the Media Gateway 310 and Media Server 315, an RTP session 415 is opened between the two devices. While RTP linkage is established between the Media Gateway and Media Server at the customer premise, a PROMPT AND COLLECT 420 is sent from the Application Server 355 to Media Server 1 315 to gather entered data by Caller 300 for establishing the conference. Media Server 1 315 returns this data to Application Server 355 via a DTMF COLLECTED message. After the Application Server 355 has this data, it sends a SIP INFO (Create Conference) 425 message to Media Server 2 320 at Enterprise site. Media Server 2 320 responds with a SIP 200 OK message to acknowledge and confirm receipt. Based on the Application Server 355 selecting Media Server 2 320 to host the call, the Application Server 355 sends a CALL TRANSFER 430 message to Media Server 1 315 to transfer the call. It contains the appropriate routing information to share with the Media Gateway for re-establishment of call on a different Media Server. Media Server 1 315 initiates a SIP REFER 435 message to the Media Gateway 310. Media Gateway 310 utilizes new information supplied by Media Server 1 to attempt establishment of session with Media Server 2 320 by sending it a SIP INVITE 440 message. Media Server 2 320 invokes a CALL WAITING 445 message to Application Server to confirm request by Media Gateway. Application Server 355 confirms that caller is valid and conference is already established and sends an ACCEPT CALL response back to Media Server 2 320. At this point, the Media Server 2 can respond to the Media Gateway with a SIP 200 OK message letting it know that the session is established. The Media Gateway 310 then responds with a SIP ACK 450 to do the final handshake with Media Server 2 320. At this point, an RTP link 455 is established between the Media Gateway and Media Server 2. Once this new RTP session is established, the Media Gateway 310 notifies the Media Server 1 315 that it can tear down the RTP session that was established between them. This is done via a SIP NOTIFY 460 message sent to the Media Server 1. The Media Server 1 responds back with a SIP 200 OK message and cleans up resources allocated for that RTP session. At this point in the process, the Enterprise Caller is in a conference on Media Server 2 at the Enterprise.

Figure 5:
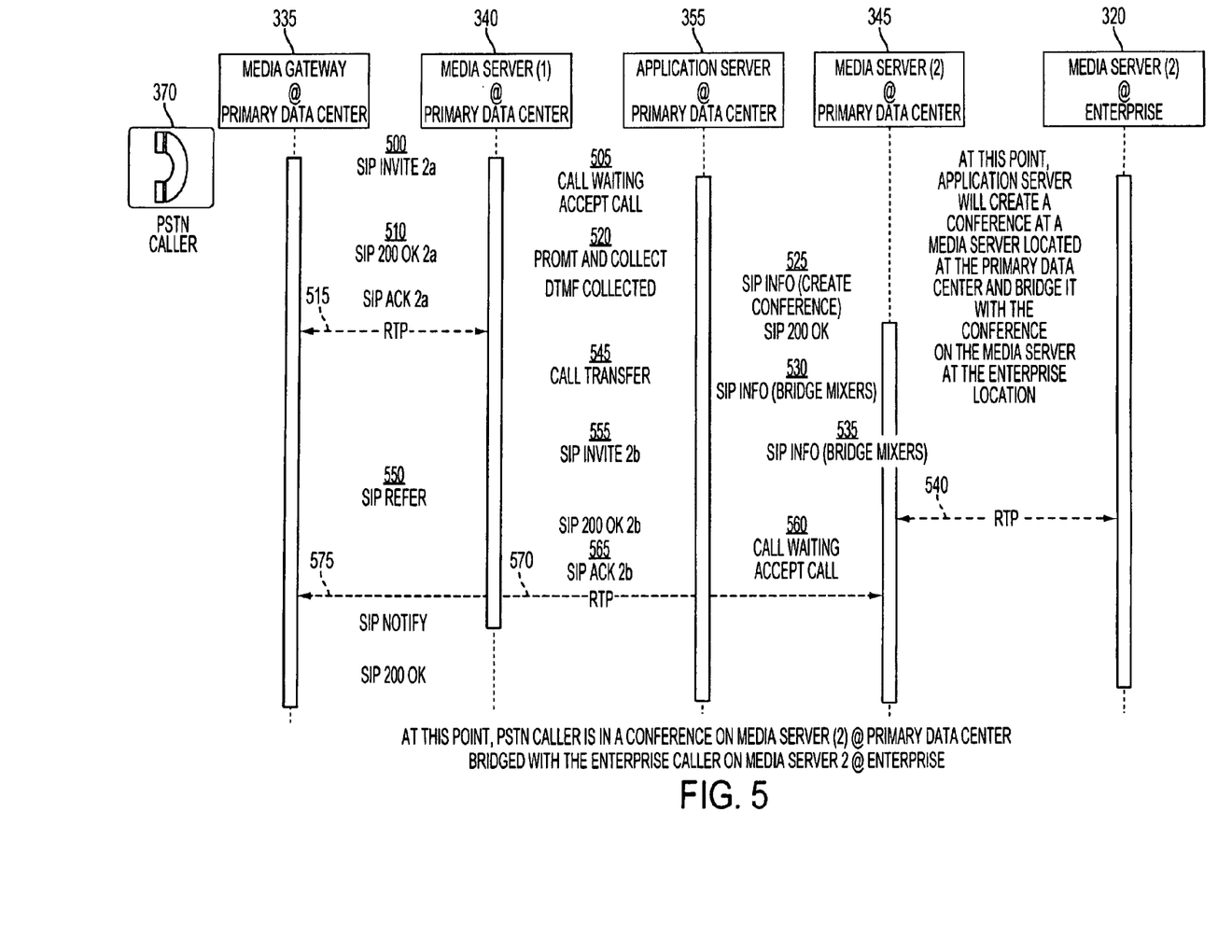
FIG. 5 depicts actual Session Initiated Protocol (SIP)/Real Time Reservation Protocol (RTP) message flows required for the external PSTN caller to join a conference call at the enterprise premise in accordance with a preferred embodiment of the present invention.

Continuing to reference FIG. 3 and now referring to FIG. 5 as message flow reference, PSTN Caller 370 is attempting to join a conference hosted at the Enterprise 385. PSTN Caller 370 enters the appropriate numbers to access the conference call. The PSTN 375, once receiving this dial string, routes the call to the Media Gateway 335 at the Conferencing Service Provider 390. The Media Gateway performs the appropriate circuit to packet translation on the incoming data and sends a SIP INVITE 500 message to the Media Server 1 340. Media Server 1 340 then initiates a CALL WAITING 505 message to Application Server 355 to establish the callers access privileges at the Conferencing Service Provider 390. Application Server 355 verifies that caller is authorized to establish a conference on this system. Once this is verified, it will respond back to the Media Server 1 340 with an ACCEPT CALL response. Media Server 1 340 then responds back to the Media Gateway 335 with a SIP 200 OK 510 message.

Media Gateway 335 will acknowledge this with a SIP ACK back to Media Server 1 340. With the session now established between the Media Gateway 335 and Media Server 340, an RTP session 515 is opened between the two devices. While RTP linkage is established between the Media Gateway and Media Server at the Conferencing Service Provider premise, a PROMPT AND COLLECT 520 is sent from the Application Server 355 to Media Server 1 340 to gather entered data by Caller 370 for establishing the conference. Media Server 1 340 returns this data to Application Server 355 via a DTMF COLLECTED message. Application Server 355 scans its current, established conferences via its internal database and knows that this caller wants to access a conference that already exists on the Enterprise 385 system. After the Application Server 355 determines this, it sends a SIP INFO (Create Conference) 525 message to Media Server 2 345 to allocate conference resources to this user. Media Server 2 345 responds with a SIP 200 OK message to acknowledge and confirm receipt. At this point in the session, the Application Server 355 sends a SIP INFO (Bridge Mixers) 530 message to Media Server 2 345 and a SIP INFO (Bridge Mixers) 535 to Media Server 2 320 at Enterprise site. At this point, Application Server 355 creates a conference at the Media Sever located at the Conferencing Service Provider Site and bridges it with the conference on the Media Server at the Enterprise location. Once each Media Server receives the action to bridge the mixers, an RTP Session 540 is established between these entities. Based on the Application Server 355 selecting Media Server 2 345 to host the call, the Application Server 355 sends a CALL TRANSFER 545 message to Media Server 1 340 to transfer the call. It contains the appropriate routing information to share with the Media Gateway for re-establishment of call on a different Media Server. Media Server 1 340 then initiates a SIP REFER 550 message to the Media Gateway 335. Media Gateway 335 utilizes new information supplied by Media Server 1 to attempt establishment of session with Media Server 2 345 by sending it a SIP INVITE 555 message. Media Server 2 345 invokes a CALL WAITING 560 message to Application Server to confirm request by Media Gateway. Application Server 355 confirms that caller is valid and conference is already established and sends an ACCEPT CALL response back to Media Server 2 345. At this point, the Media Server 2 can respond to the Media Gateway with a SIP 200 OK message letting it know that the session is established. The Media Gateway 335 then responds with a SIP ACK 565 to do the final handshake with Media Server 2 345. At this point, an RTP link 570 is established between the Media Gateway and Media Server 2. Once this new RTP session is established, the Media Gateway 335 notifies the Media Server 1 340 that it can tear down the RTP session that was established between them. This is done via a SIP NOTIFY 575 message sent to the Media Server 1. The Media Server 1 responds back with a SIP 200 OK message and cleans up resources allocated for that RTP session. At this point in the process, the PSTN Caller is in a conference on Media Server 2 at the Conferencing Service Provider site bridged with the Enterprise Caller on the Media Server 2 conference at the Enterprise location.

The description of the present invention has been presented for purposes of illustration and description, but is not intended to be exhaustive or limited to the invention in the form disclosed. Many modifications and variations will be apparent to those of ordinary skill in the art. For example, although the processes and apparatus of present invention are illustrated with voice conferencing and SIP/RTP IP Telephony messaging, the processes and apparatus of the present invention may be implemented in other types of networks and protocols. For example, the present invention may be illustrated in SIP/RTP protocols or MPLS (Multi Protocol Label Switching)/RSVP (Resource Reservation Protocol). The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, comprising:
   exchanging a first SIP INVITE message between a Media Gateway of an Enterprise and a first Media Server of the Enterprise;
   initiating a CALL WAITING message from the first Media Server to an Application Server of a Conferencing Service Provider to establish conference call resources at the Conferencing Service Provider;
   verifying at the Application Server that a caller initiating the first SIP INVITE message is authorized to establish the Enterprise conferencing;
   sending a PROMPT AND COLLECT message from the Application Server to the first Media Server; and
   acknowledging a response from the first Media Server by the Media Gateway.

2. The method of claim 1, further comprising:
   opening a first RTP session between the Media Gateway and the first Media Server; and
   collecting and sending data from the caller to establish the Enterprise conferencing and from the first Media Server to the Application Server via a DTMF COLLECTED message.

3. The method of claim 2, further comprising:
   after receipt of the data by the Application Server, sending a SIP INFO message from the Application Server to a second Media Server of the Enterprise;
   acknowledging receipt of the SIP INFO message at the second Media Server and selection by the Application Server of the second Media Server to host a call; and
   sending a CALL TRANSFER message from the Application Server to the first Media Server to transfer the call.

4. The method of claim 3, wherein the CALL TRANSFER message includes routing information operable to be shared with the Media Gateway for establishment of the call on the second Media Server.

5. The method of claim 3, further comprising:
   sending a SIP REFER message from the first Media Server to the Media Gateway, wherein the SIP REFER message includes information about the second Media Server; and
   using the information about the second Media Server from the SIP REFER message, and exchanging a second SIP INVITE message between the Media Gateway and the second Media Server.

6. The method of claim 5, further comprising:
   sending a CALL WAITING message from the second Media Server to the Application Server to confirm the second SIP INVITE message from the Media Gateway;
   sending an ACCEPT CALL response from the Application Server to the second Media Server indicating that a conference call has been established;
   establishing a second RTP session between the Media Gateway and the second Media Server; and
   terminating the first RTP session between the Media Gateway and the first Media Server.

7. A method, comprising:
   connecting a communication device with a Media Gateway at a Conferencing Service Provider through a PSTN;
   sending a first SIP INVITE message from the Media Gateway to a first Media Server at the Conferencing Service Provider;
   sending a CALL WAITING message from the first Media Server to an Application Server at the Conferencing Service Provider;
   verifying at the Application Server that a caller has access privileges for an established conference call;
   upon verification, sending an ACCEPT CALL message from the Application Server to the first Media Server;
   sending a PROMPT AND COLLECT message from the Application Server to the first Media Server; and
   sending an acknowledgement message from the Media Gateway to the first Media Server.

8. The method for joining a conference call hosted at an Enterprise of claim 7, further comprising:
   opening a first RTP session between the Media Gateway and the first Media Server; and
   collecting and sending data from a call requesting to join the established conference call and from the first Media Server to the Application Server via a DTMF COLLECTED message.

9. The method of claim 8, further comprising:
   after receipt of the data by the Application Server, scanning a database of the Application Server to determine that the established conference call still exists;
   upon determination, sending a CREATE CONFERENCE message from the Application Server to a second Media Server at the Conferencing Service Provider to allocate resources to the caller;
   responding to the CREATE CONFERENCE message to acknowledge receipt of the CREATE CONFERENCE message at the second Media Server; and
   sending a first BRIDGE MIXERS message from the Application Server to the second Media Server at the Conferencing Service Provider and sending a second BRIDGE MIXERS message from the Application Server to a third Media Server at the Enterprise site.

10. The method of claim 9, further comprising bridging Mixers to establish a second RTP Session between the third Media Server and the second Media Server.

11. The method of claim 10, further comprising sending a CALL TRANSFER message from the Application Server to the first Media Server to transfer the call.

12. The method of claim 11, wherein the CALL TRANSFER message includes routing information operable to be shared with the Media Gateway for establishment of the call on the second Media Server.

13. The method of claim 12, further comprising:
   sending a SIP REFER message from the first Media Server to the Media Gateway, wherein the SIP REFER message includes information about the second Media Server; and
   using the information about the second Media Server from the SIP REFER message, and exchanging a second SIP INVITE message between the Media Gateway and the second Media Server.

14. The method of claim 13, further comprising:
   sending a CALL WAITING message from the second Media Server to the Application Server to confirm the second SIP INVITE message from the Media Gateway;
   sending an ACCEPT CALL response from the Application Server to the second Media Server;
   establishing a second RTP session between the Media Gateway and the second Media Server; and
   terminating the first RTP session between the Media Gateway and the first Media Server.

15. A non-transitory computer readable medium comprising instructions that when executed by a processor perform:
   exchanging a first SIP INVITE message between a Media Gateway of the Enterprise and a first Media Server of the Enterprise;
   initiating a CALL WAITING message from the first Media Server to an Application Server of a Conferencing Service Provider to establish conference call resources at the Conferencing Service Provider;
   verifying at the Application Server that a caller initiating the first SIP INVITE message is authorized to establish the Enterprise conferencing, and upon verification;
   sending a PROMPT AND COLLECT message from the Application Server to the first Media Server; and
   receiving acknowledgement of the response from the first Media Server with a SIP ACK message from the Media Gateway.

16. The non-transitory computer readable medium of claim 15, comprising instructions that when executed by the processor perform receiving gathered data from the call requesting to join the established conference call and from the first Media Server at the Application Server in a form of a DTMF COLLECTED message.

17. The non-transitory computer readable medium of claim 16, comprising instructions that when executed by the processor perform:
   after receipt of the data by the Application Server, sending a SIP INFO message from the Application Server to a second Media Server of the Enterprise;
   acknowledging receipt of the SIP INFO message at the second Media Server and selection by the Application Server of the second Media Server to host a call; and
   sending a CALL TRANSFER message from the Application Server to the first Media Server to transfer the call.

18. The non-transitory computer readable medium of claim 17, wherein the CALL TRANSFER message includes routing information operable to be shared with the Media Gateway for establishment of the call on the second Media Server.

19. The non-transitory computer readable medium of claim 17, comprising instructions that when executed by the processor perform:
   sending a SIP REFER message from the first Media Server to the Media Gateway, wherein the SIP REFER message includes information about the second Media Server; and
   using the information about the second Media Server from the SIP REFER message, exchanging a second SIP INVITE message between the Media Gateway and the second Media Server.

20. The non-transitory computer readable medium of claim of claim 19, comprising instructions that when executed by the processor perform:
   sending a CALL WAITING message from the second Media Server to the Application Server to confirm the second SIP INVITE message from the Media Gateway;

sending an ACCEPT CALL response from the Application Server to the second Media Server indicating that a conference call has been established;

establishing a second RTP session between the Media Gateway and the second Media Server; and terminating the first RTP session between the Media Gateway and the first Media Server.

* * * * *